(12) United States Patent
Motokado et al.

(10) Patent No.: US 9,128,646 B2
(45) Date of Patent: Sep. 8, 2015

(54) INFORMATION PROCESSING APPARATUS, INFORMATION PROCESSING METHOD, AND COMPUTER READABLE RECORDING MEDIUM STORED WITH INFORMATION PROCESSING PROGRAM

(75) Inventors: Shinichiro Motokado, Hachioji (JP); Chie Sueoka, Hachioji (JP); Koji Sato, Fujisawa (JP); Masatoshi Sato, Fukushima (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 933 days.

(21) Appl. No.: 12/534,976

(22) Filed: Aug. 4, 2009

(65) Prior Publication Data
US 2010/0033759 A1  Feb. 11, 2010

(30) Foreign Application Priority Data
Aug. 7, 2008  (JP) ................................. 2008-204413

(51) Int. Cl.
G06F 3/12   (2006.01)
G06K 15/00  (2006.01)

(52) U.S. Cl.
CPC ............ *G06F 3/1205* (2013.01); *G06F 3/1239* (2013.01); *G06F 3/1253* (2013.01); *G06F 3/1288* (2013.01)

(58) Field of Classification Search
USPC ............. 358/1.15; 707/9; 716/115; 726/12, 5
See application file for complete search history.

(56) References Cited

U.S. PATENT DOCUMENTS 5,857,024 A * 1/1999 Nishino et al. ................ 713/172
6,321,334 B1 * 11/2001 Jerger et al. ........................ 726/1

(Continued)

FOREIGN PATENT DOCUMENTS

JP  09-305063  11/1997
JP  11-232059  8/1999

(Continued)

OTHER PUBLICATIONS

Office Action (Decision to Grant a Patent) dated Jun. 7, 2011, issued in the corresponding Japanese Patent Application No. 2008-204413, and an English Translation thereof.

(Continued)

*Primary Examiner* — Akwasi M Sarpong
(74) *Attorney, Agent, or Firm* — Buchanan Ingersoll & Rooney PC

(57) ABSTRACT

An information processing apparatus to be used in a printing system having a client apparatus connected to an image forming apparatus via a network, and a server apparatus that manages setting parameters of printing conditions that can be set up on said client apparatus, said information processing apparatus being able to serve as the client apparatus and comprising: a judgment unit for judging whether said information processing apparatus is a client apparatus or not, with reference to identification information concerning said image forming apparatus stored inside said information processing apparatus; and a setting screen control unit for providing a setting screen that allows a user to select said setting parameters if it is judged that said information processing apparatus is not a client apparatus, and for providing a setting screen that allows a user to modify setting values of said selected setting parameters and prevents the user from modifying setting values of the remaining setting parameters if it is judged that said information processing apparatus is a client apparatus.

19 Claims, 18 Drawing Sheets

(56) References Cited

U.S. PATENT DOCUMENTS

| | | | |
|---|---|---|---|
| 6,501,421 B1* | 12/2002 | Dutta et al. | 342/357.22 |
| 6,769,127 B1* | 7/2004 | Bonomi et al. | 725/39 |
| 7,218,944 B2* | 5/2007 | Cromer et al. | 455/515 |
| 7,240,309 B2* | 7/2007 | Saito et al. | 716/115 |
| 7,359,076 B2* | 4/2008 | Uchino | 358/1.15 |
| 7,421,472 B1* | 9/2008 | Ross, Jr. | 709/206 |
| 7,426,045 B2* | 9/2008 | Horiyama | 358/1.13 |
| 7,454,785 B2* | 11/2008 | Kerstens et al. | 726/12 |
| 7,502,797 B2* | 3/2009 | Schran et al. | 1/1 |
| 7,607,140 B2* | 10/2009 | Kato et al. | 719/321 |
| 7,619,758 B2* | 11/2009 | Kujirai et al. | 358/1.13 |
| 7,872,771 B2* | 1/2011 | Kojima et al. | 358/1.15 |
| 8,040,547 B2* | 10/2011 | Ando | 358/1.15 |
| 2003/0123079 A1* | 7/2003 | Yamaguchi et al. | 358/1.15 |
| 2004/0223182 A1* | 11/2004 | Minagawa | 358/1.15 |
| 2005/0094185 A1* | 5/2005 | Hayakawa | 358/1.14 |
| 2005/0257274 A1* | 11/2005 | Shiga et al. | 726/28 |
| 2006/0044586 A1* | 3/2006 | Kujirai et al. | 358/1.13 |
| 2006/0061803 A1* | 3/2006 | Oka | 358/1.15 |
| 2006/0070125 A1* | 3/2006 | Pritchard et al. | 726/18 |
| 2006/0161547 A1* | 7/2006 | Ohtani | 707/9 |
| 2006/0170947 A1 | 8/2006 | Kurabayashi | |
| 2007/0143830 A1* | 6/2007 | Abraham et al. | 726/5 |
| 2007/0198849 A1* | 8/2007 | Mozer | 713/186 |
| 2008/0192293 A1* | 8/2008 | Sugimoto | 358/1.15 |
| 2009/0109476 A1* | 4/2009 | Ando | 358/1.15 |
| 2009/0201540 A1* | 8/2009 | Morooka | 358/1.15 |
| 2009/0228963 A1* | 9/2009 | Pearce et al. | 726/5 |
| 2009/0328186 A1* | 12/2009 | Pollutro et al. | 726/13 |

FOREIGN PATENT DOCUMENTS

| | | |
|---|---|---|
| JP | 2004-206553 | 7/2004 |
| JP | 2005-050062 | 2/2005 |
| JP | 2005-301613 | 10/2005 |
| JP | 2006-185105 | 7/2006 |
| JP | 2006-209292 A | 8/2006 |
| JP | 2006-343833 | 12/2006 |
| JP | 2008-073183 | 4/2008 |

OTHER PUBLICATIONS

Search Report dated Jan. 20, 2011, issued in the corresponding European Patent Application No. 09164313.0-1245.

Official Action issued by European Patent Office on Mar. 7, 2013 in European Application No. 09 164 313.0-1959, and English language translation of Official Action (11 pgs).

Notification of Reason for Refusal issued in the corresponding Japanese Patent Application No. 2008-204413 dated May 25, 2010, and an English Translation thereof.

* cited by examiner

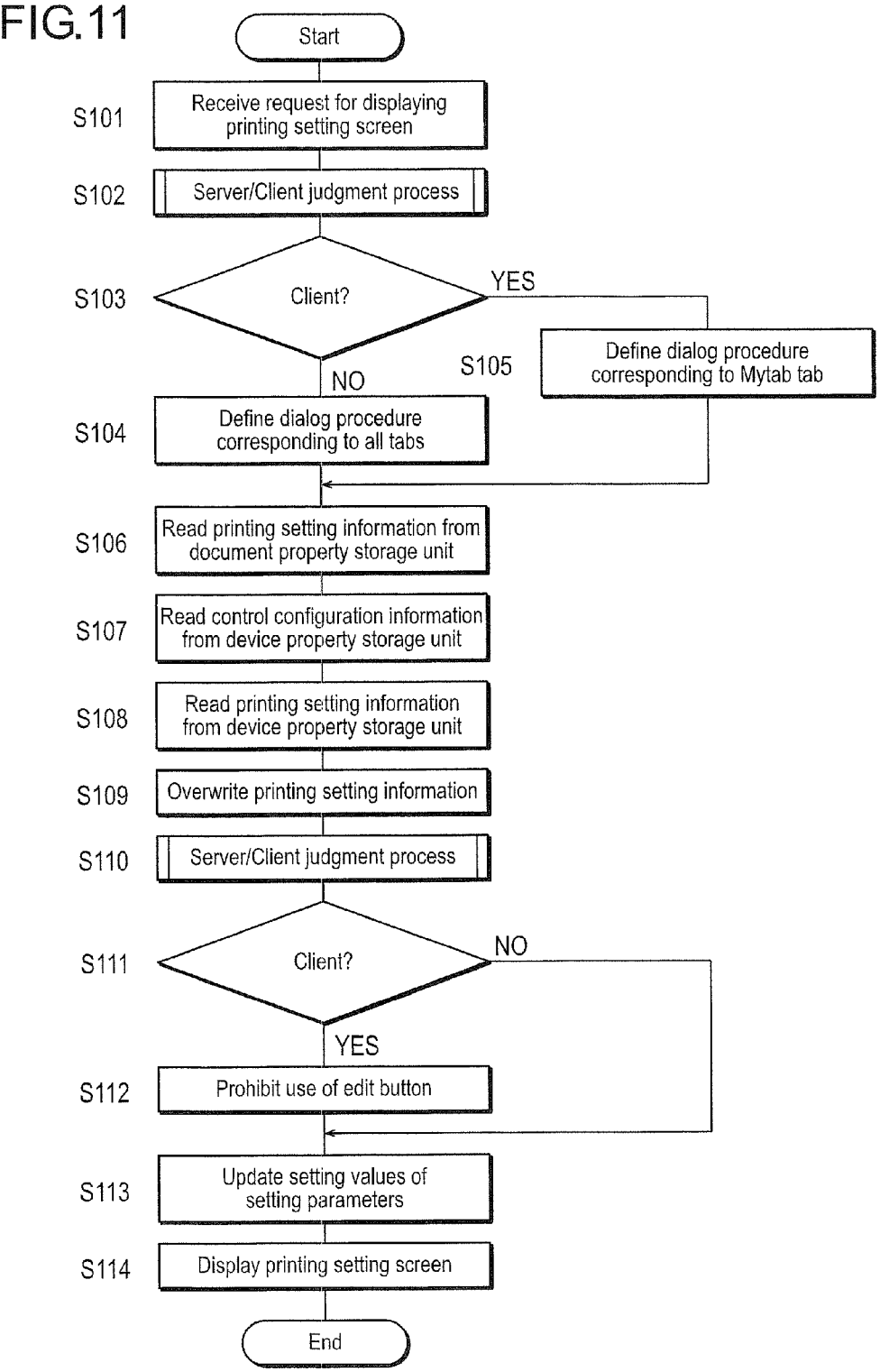

FIG.12

```
UI display information

+Dialog procedure definition information
   +Dialog procedure for "MyTAB" tab
   +Dialog procedure for "Basic setting" tab
   +Dialog procedure for "Layout" tab
   + ...

+ Control configuration information of MyTAB screen
   +"Document orientation"
   +"Number of copies"
   +"Staple"
   +"Punching"
   +"Stamp"
   + "Copy protect"

+Printing setting information
    + Printing setting for "Basic setting" tab
      +"Document orientation" = vertical
      +"Number of copies" = 1
      + ...
    + Printing setting for "Layout" tab
      + ...
    +Printing setting for "Finish" tab
      +"Staple" = Off
      +"Punching" = Off
      + ...
    +Printing setting for + "Stamp/Form" tab
      +"Stamp" = Off
      +"Copy protect" = Off
      + ...
    + ...
```

INFORMATION PROCESSING APPARATUS, INFORMATION PROCESSING METHOD, AND COMPUTER READABLE RECORDING MEDIUM STORED WITH INFORMATION PROCESSING PROGRAM

CROSS-REFERENCE TO RELATED APPLICATION

This application is based on Japanese Patent Application No. 2008-204413 filed on Aug. 7, 2008, the contents of which are incorporated herein by reference.

BACKGROUND

1. Technical Field

The present invention relates to an information processing apparatus, an information processing method, and a computer readable recording medium stored with an information processing program. The present invention particularly relates to an information processing apparatus, an information processing method, and a computer readable recording medium stored with an information processing program used for a printing system in which a plurality of information processing apparatuses share a printer.

2. Description of Related Art

In a configuration in which a plurality of information processing apparatuses share a printer via a network, a server/client environment consisting of a server apparatus and a plurality of client apparatuses is constituted. In such a server/client environment, the server manager may restrict the setting parameters of the printing conditions that are allowed to be used by the users of the client apparatuses.

As to the technology for the server manager to restrict the setting parameters that are allowed to be used by the users of the client apparatuses, a setting process of the printer driver has been proposed as disclosed in the following Unexamined Japanese Patent Publication No. 2006-209292. The setting process disclosed in the Unexamined Japanese Patent Publication No. 2006-209292 is to display a special setting screen by activating the printer driver via a dedicated setting program. By specifying the attributes of the setting parameters via the special setting screen, the server manager can gray out (inactivate) certain setting parameters that are not allowed to be used by the users of the client apparatuses on the printing setting screen provided by the printer driver.

However, the abovementioned setting process has a problem that it is necessary to manage the dedicated application in addition to the printer driver as it is necessary to activate the dedicated application on the server apparatus side. Moreover, there are cases where the installation itself is difficult depending on the security condition of the usage environment in such a dedicated application.

Furthermore, there is another problem that the printer driver screen is not efficient as a user interface, as a large area of the printer driver screen is occupied uselessly by grayed out setting parameters in the configuration of the Unexamined Japanese Publication No. 2006-209292 in which unusable setting parameters are supposed to be grayed out on the client apparatus side.

SUMMARY

The invention is made to solve the abovementioned problems. An object of the present invention is to provide an information processing apparatus, an information processing method, and a computer readable recording medium stored with an information processing program that enable the server manager to restrict the setting parameters that are allowed to be used by the users of the client apparatuses without using the dedicated application on the server apparatus.

Yet another object of the present invention is to materialize a user interface that provides the users of the client apparatuses with the setting parameters that are allowed to be used by them, by efficiently using the printer driver screen of the client apparatus side in restricting the setting parameters that are allowed to be used by the users of the client apparatuses.

To achieve at least one of the abovementioned objects, the information processing apparatus reflecting one aspect of the present invention to be used in a printing system having a client apparatus which is an information processing apparatus functioning as a client connected to an image forming apparatus via a network, and a server apparatus that manages setting parameters of printing conditions that can be set up on said client apparatus, said information processing apparatus being able to serve as said client apparatus and comprising: a judgment unit for judging whether said information processing apparatus is a client apparatus whose setting parameters of printing conditions are managed by said server apparatus or not, with reference to identification information concerning said image forming apparatus stored inside said information processing apparatus; and a setting screen control unit for providing a setting screen that allows a user to select said setting parameters if it is judged that said information processing apparatus is not a client apparatus, and for providing a setting screen that allows a user to modify setting values of said selected setting parameters and prevents the user from modifying setting values of the remaining setting parameters if it is judged that said information processing apparatus is a client apparatus.

In the abovementioned information processing apparatus, it is preferable that said client apparatus has a printer driver for said image forming apparatus copied from said server apparatus via said network; and said identification information varies depending on whether said printer driver is copied from said server apparatus or not.

It is preferable that the abovementioned information processing apparatus further comprises: a setting parameter receiving unit for receiving the user's selection of said setting parameters via a setting screen that allows said setting parameters to be selected, if it is judged that said information process apparatus is not a client apparatus; and a setting screen configuration unit for displaying said selected setting parameters collectively on said setting screen; wherein said setting screen control unit provides a setting screen on which said selected setting parameters are displayed collectively, if it is judged that said information processing apparatus is a client apparatus.

To achieve at least one of the abovementioned objects, the information processing apparatus reflecting one aspect of the present invention to be used in a printing system having a client apparatus connected to an image forming apparatus via a network, and a server apparatus which is an information processing apparatus functioning as a server for managing setting parameters of printing conditions that can be set up on said client apparatus, comprising: a printer driver with said setting parameters are assigned to either one of a plurality of screens, wherein the setting parameters of the printing conditions that can be set up on said client apparatus are displayed collectively on a specified screen among said plurality of screens, and said information processing apparatus provides said client apparatus with a printer driver having said specific screen.

In the abovementioned information processing apparatus, it is preferable that said specific screen can contain pre-registered setting parameters of the printing conditions that are displayed on other screens.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 11 is a flowchart for describing the process of supplying the printing setting screen by the printer driver in the server PC and the client PC.

FIG. 12 is a diagram showing an example of UI display information.

DETAILED DESCRIPTION

The embodiment of this invention will be described below with reference to the accompanying drawings.

Figure 1:
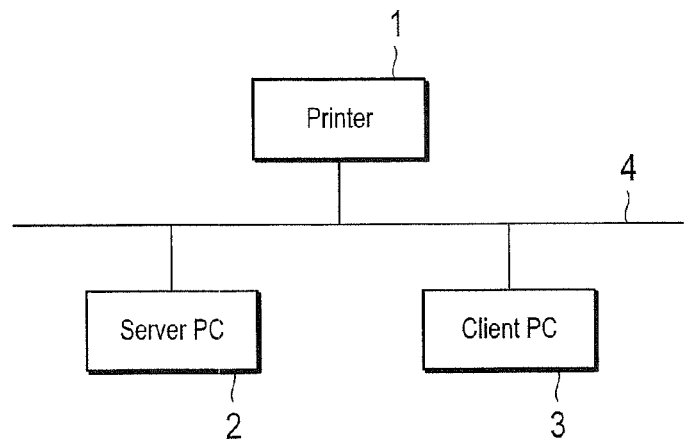
FIG. 1 is a block diagram showing the overall constitution of a printing system according to an embodiment of the present invention.

FIG. 1 is a block diagram showing the overall constitution of a printing system according to an embodiment of the present invention.

As shown in FIG. 1, the printing system according to the present embodiment has a printer 1, a server PC (personal computer) 2, and a client PC 3. The printer 1, the server PC 2, and the client PC 3 are interconnected via a network 4 so that they can communicate with each other. The server PC 2 has the printer driver for the printer 1 installed by conventional operations (hereinafter referred to as "locally installed"). The printer driver for the printer 1 is installed on the client PC 3 by the Point & Print function provided by the Windows (registered trademark) (hereinafter referred to as "Point & Print installed"). The Point & Print function is an installation method in which a printer driver is copied from the server PC to the client PC as the client PC designates the common printer of the server PC.

The network 4 consists of various networks such as a LAN connecting computers and network equipment according to standards such as Ethernet, Token Ring, and FDDI, or a WAN that consists of several LANs connected by a dedicated line. The types and the number of equipment to be connected to the network 4 are not limited to those shown in FIG. 1.

Figure 2:
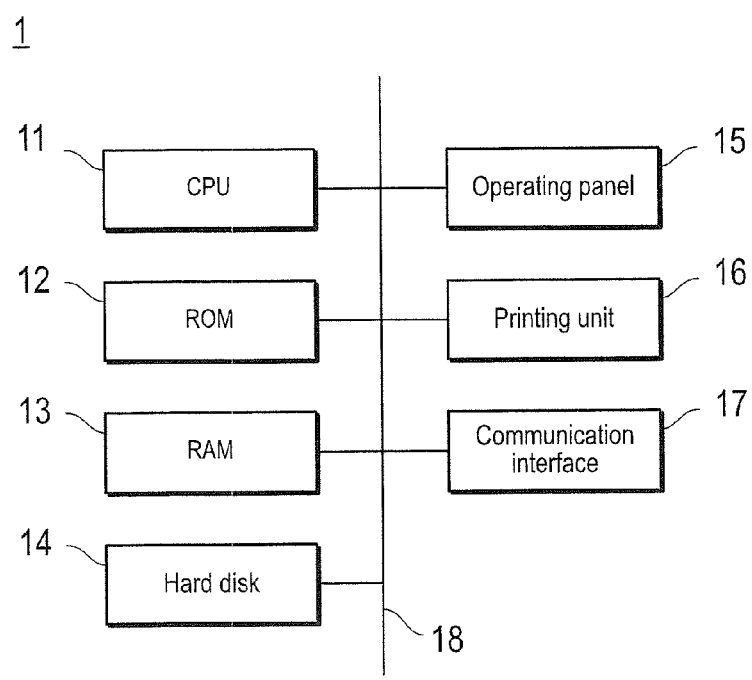
FIG. 2 is a block diagram showing the constitution of the printer shown in FIG. 1.

FIG. 2 is a block diagram showing the constitution of the printer 1 shown in FIG. 1. The printer 1 as an image forming apparatus includes a CPU 11, a ROM 12, a RAM 13, a hard disk 14, an operating panel 15, a printing unit 16, and a communication interface 17, all of which are interconnected by a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and data.

The operating panel 15 is equipped with a touch panel, a ten-key pad, a start button, a stop button and others to be used for displaying various data and entering various instructions. The printing unit 16 prints various images based on various data on a recording medium such as paper using a known image forming process such as an electronic photography type process.

The communication interface 17 is an interface for communications between other equipment such as the server PC 2 via the network 4, for which various local connection interfaces, e.g., network interfaces such as Ethernet, Token Ring, and FDDI standards, serial interfaces such as USB and IEEE 1394, parallel interfaces such as SCSI and IEEE 1284, and wireless communication interfaces such as Bluetooth (registered trademark), IEEE 802.11, HomeRF, IrDA, as well as telephone circuit interfaces for connection to telephone circuits can be used.

Figure 3:
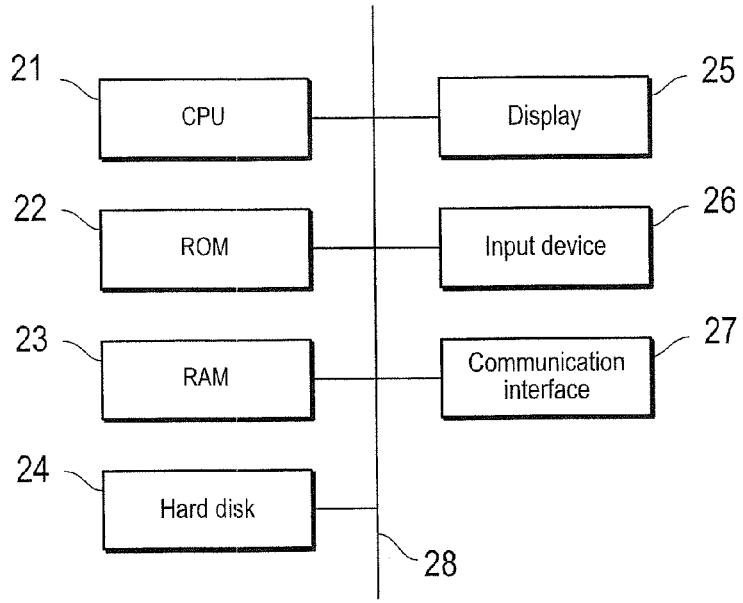
FIG. 3 is a block diagram showing the constitution of the server PC shown in FIG. 1.

FIG. 3 is a block diagram showing the constitution of the server PC 2 shown in FIG. 1. The server PC 2 as an information processing apparatus includes a CPU 21, a ROM 22, a RAM 23, a hard disk 24, a display 25, an input device 26, and a communication interface 27, all of which are interconnected by a bus 28 for exchanging signals. The descriptions of those parts of the server PC 2 that have the same functions as those of the corresponding parts of the printer 1 will be omitted here to avoid being duplicative.

The display 25 is typically a CRT or a LCD and displays various kinds of information. The input device 26 consists of pointing devices such as a mouse, a keyboard, and others, and is used for making various kinds of inputs.

As mentioned before, the printer driver for controlling the printer 1 is locally installed on the hard disk 24.

Figure 4:
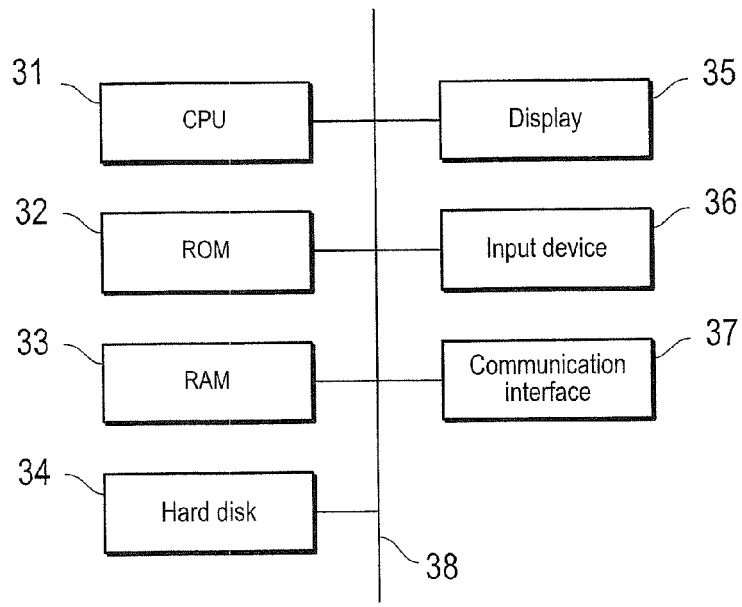
FIG. 4 is a block diagram showing the constitution of the client PC shown in FIG. 1.

FIG. 4 is a block diagram showing the constitution of the client PC 3 shown in FIG. 1. The client PC 3 as an information processing apparatus includes a CPU 31, a ROM 32, a RAM 33, a hard disk 34, a display 35, an input device 36, and a communication interface 37, all of which are interconnected by a bus 38 for exchanging signals. Since various parts of the client PC 3 are similar to those corresponding parts of the server PC 2, their descriptions are omitted here.

A document file preparation application and a printer driver for controlling the printer 1 are installed on the hard disk 34. As described in the above, an equivalent printer driver is Point & Print installed on the hard disk 34 of the client PC 3 by being copied from the server PC 2 via the network 4. The printer driver is used to set up various parameters of the printing conditions based on the user's operations using the printing setting screen to be described later and to generate printing data of a format that can be processed by the printer 1 based on the data provided by the document file preparation application.

The printer 1, the server PC 2, and the client PC 3 can each contain constituents other than those described above, or may lack a portion of the abovementioned constituents.

FIG. 5 shows an example of the printing setting screen provided by the printer driver installed on the server PC 2 and the client PC 3. In the present embodiment, different printing setting screens are provided to the user from the server PC 2 and the client PC 3.

Figure 5A:
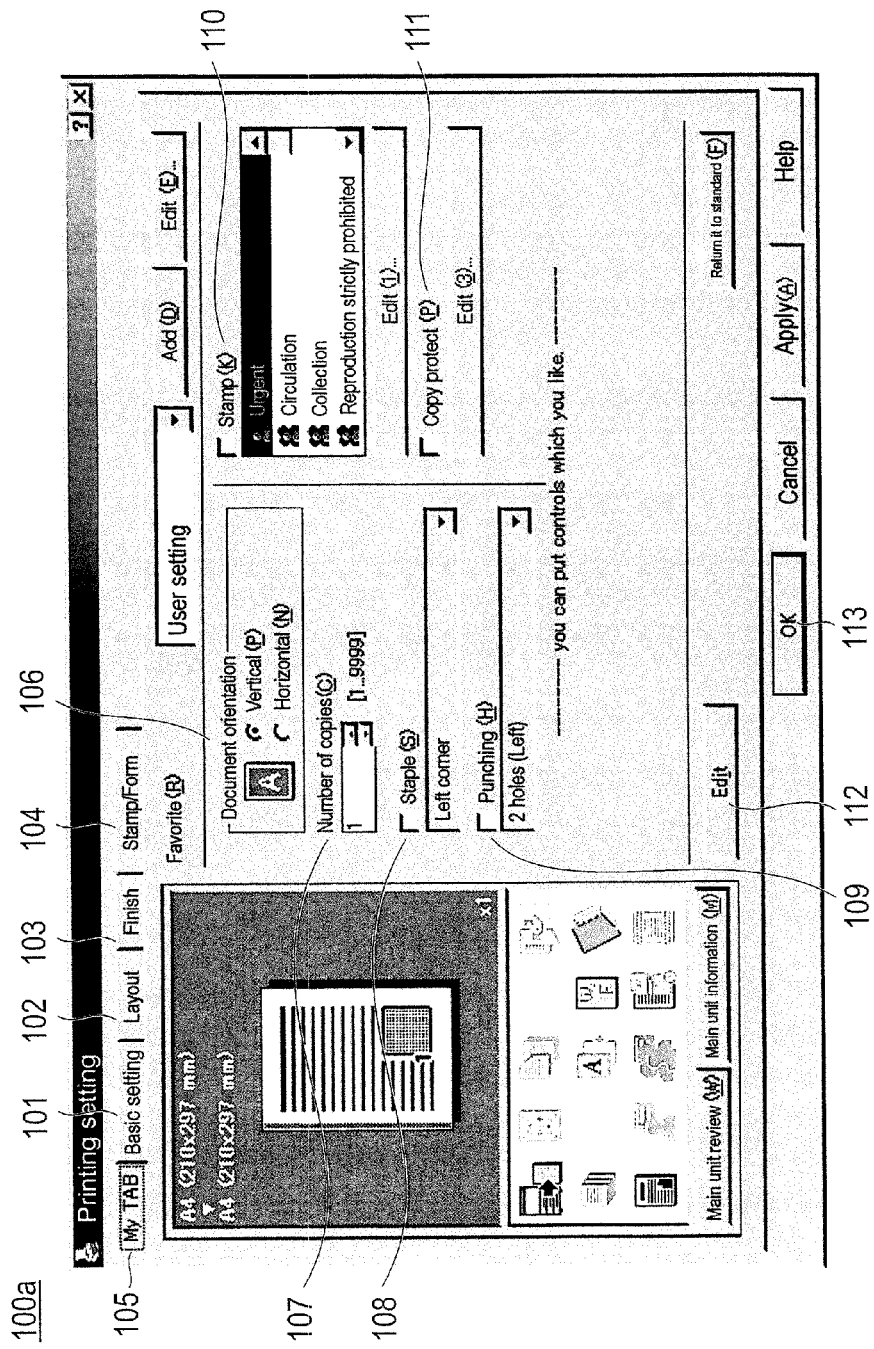
FIG. 5(A) is a diagram showing an example of the printing setting screen provided by the printer driver installed on the server PC.
Figure 5B:
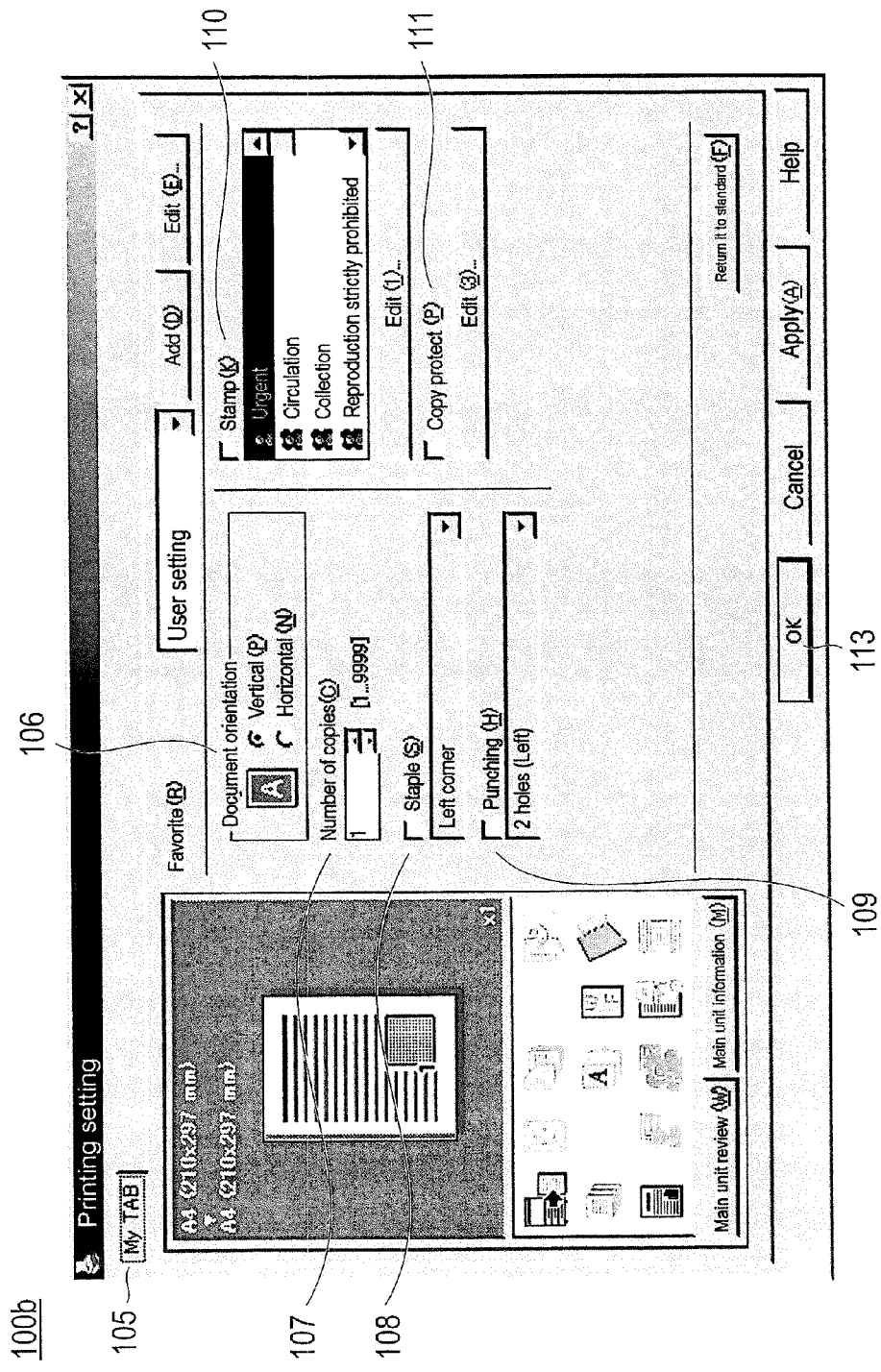
FIG. 5(B) is a diagram showing an example of the printing setting screen provided by the printer driver installed on the client PC.
Figure 6:
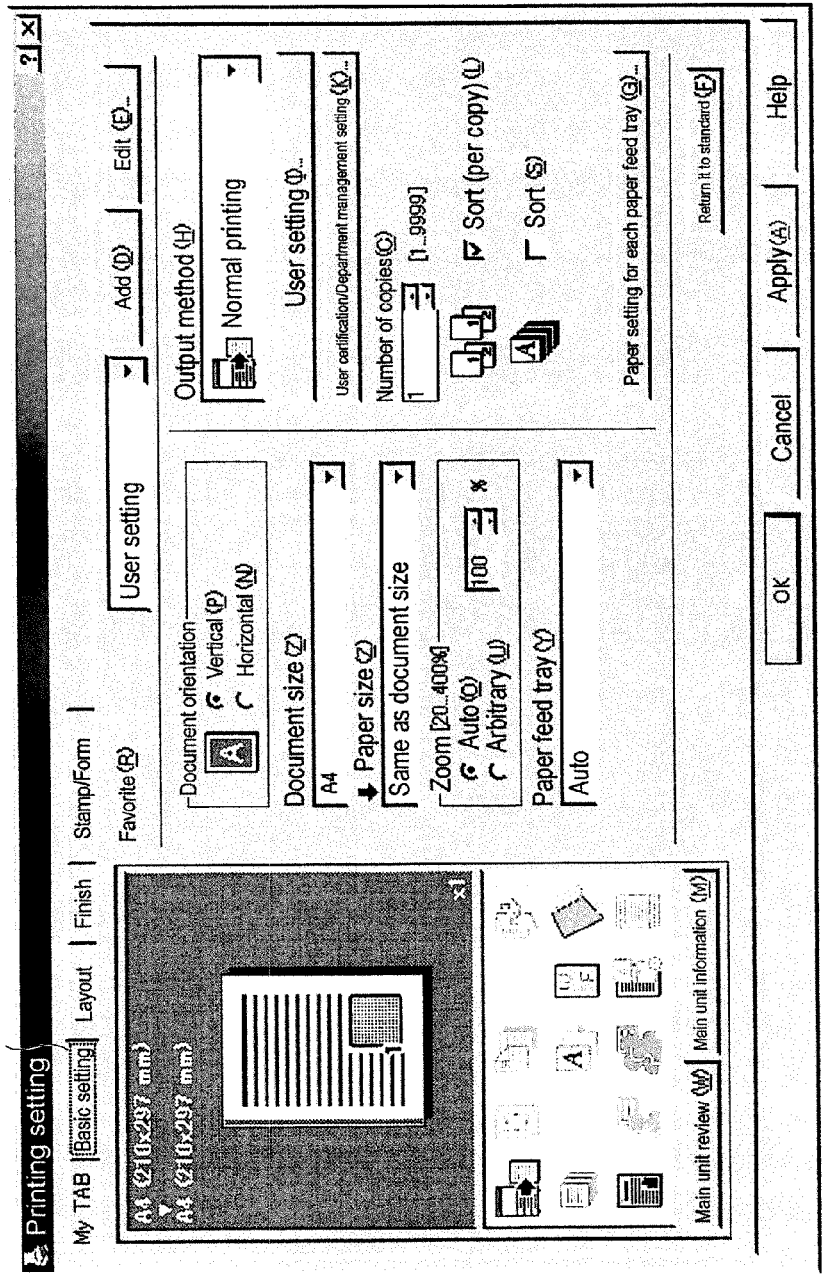
FIG. 6 is a diagram showing an example printing setting screen on which the basic setting tab is selected.
Figure 7:
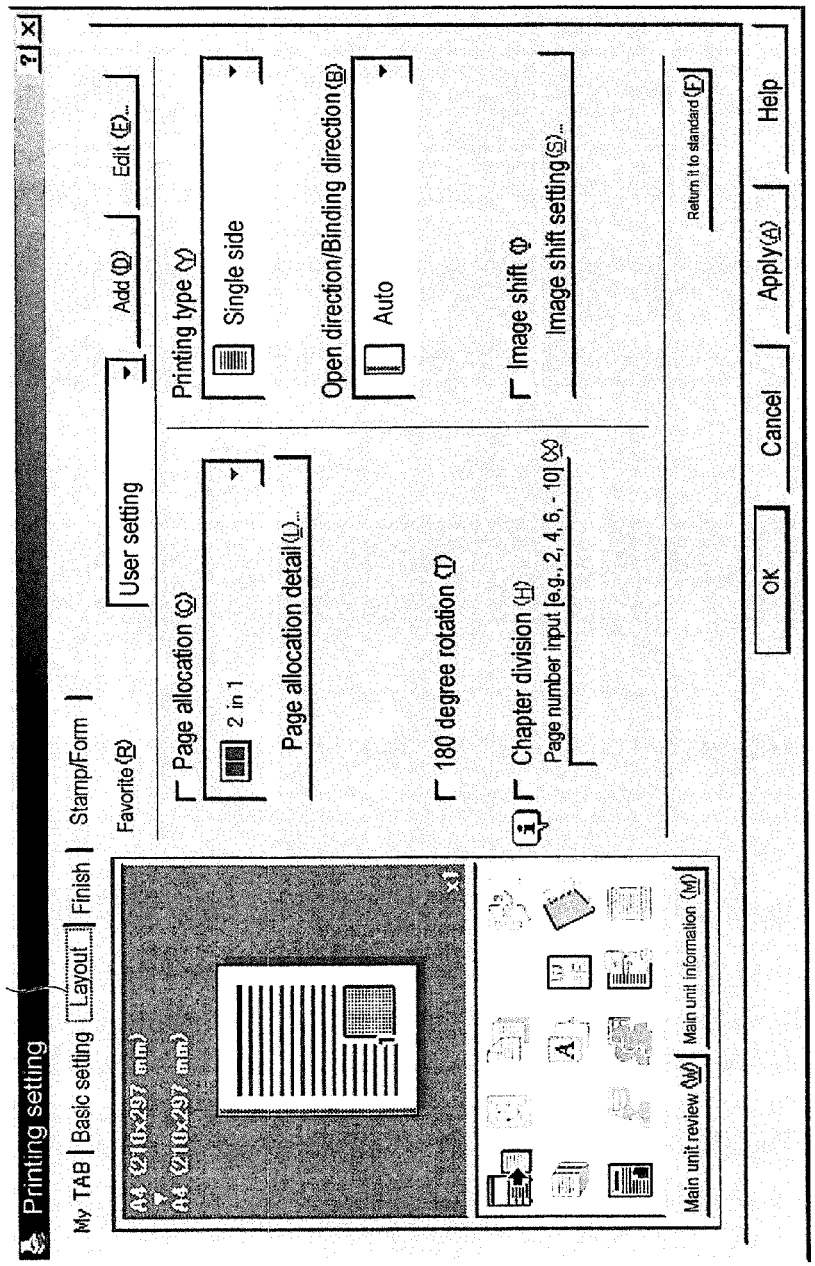
FIG. 7 is a diagram showing an example printing setting screen on which the layout tab is selected.
Figure 8:
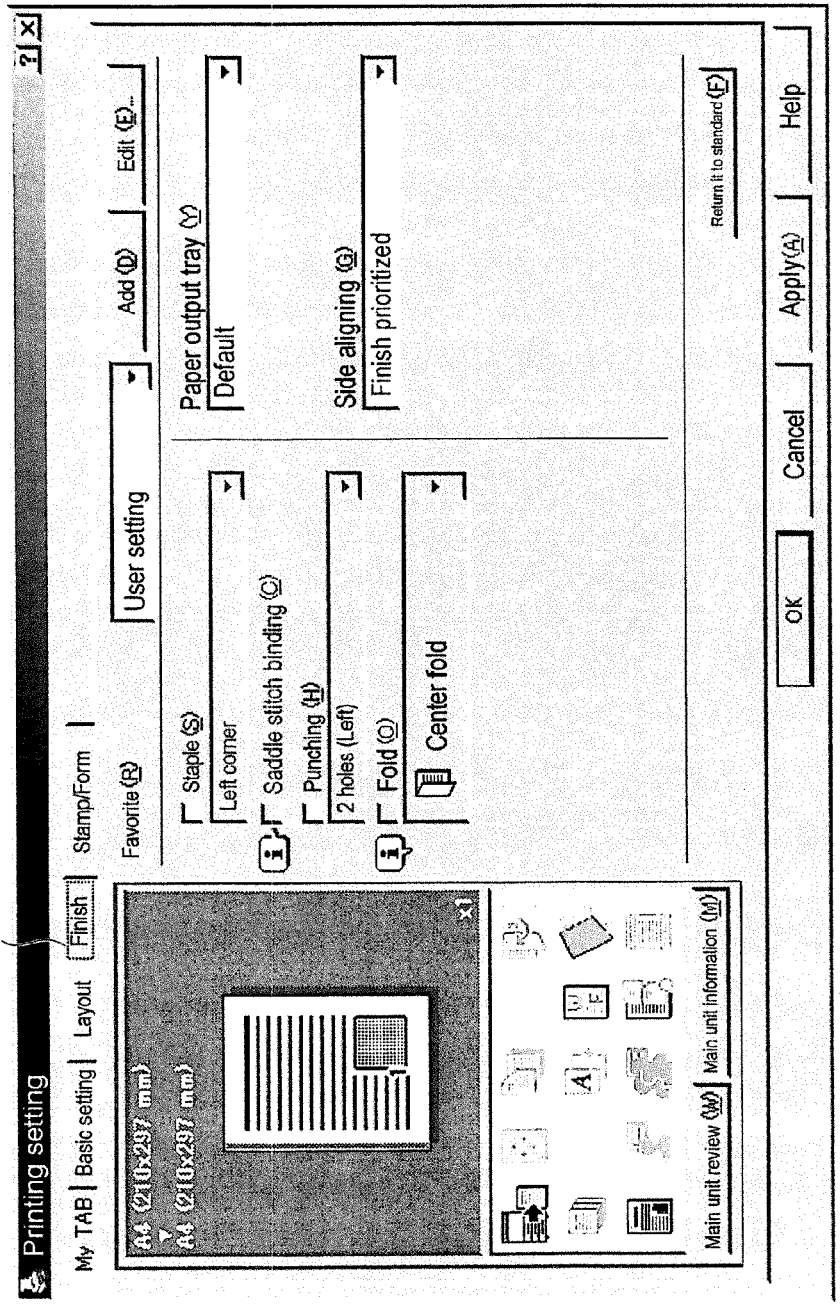
FIG. 8 is a diagram showing an example printing setting screen on which the finish tab is selected.
Figure 9:
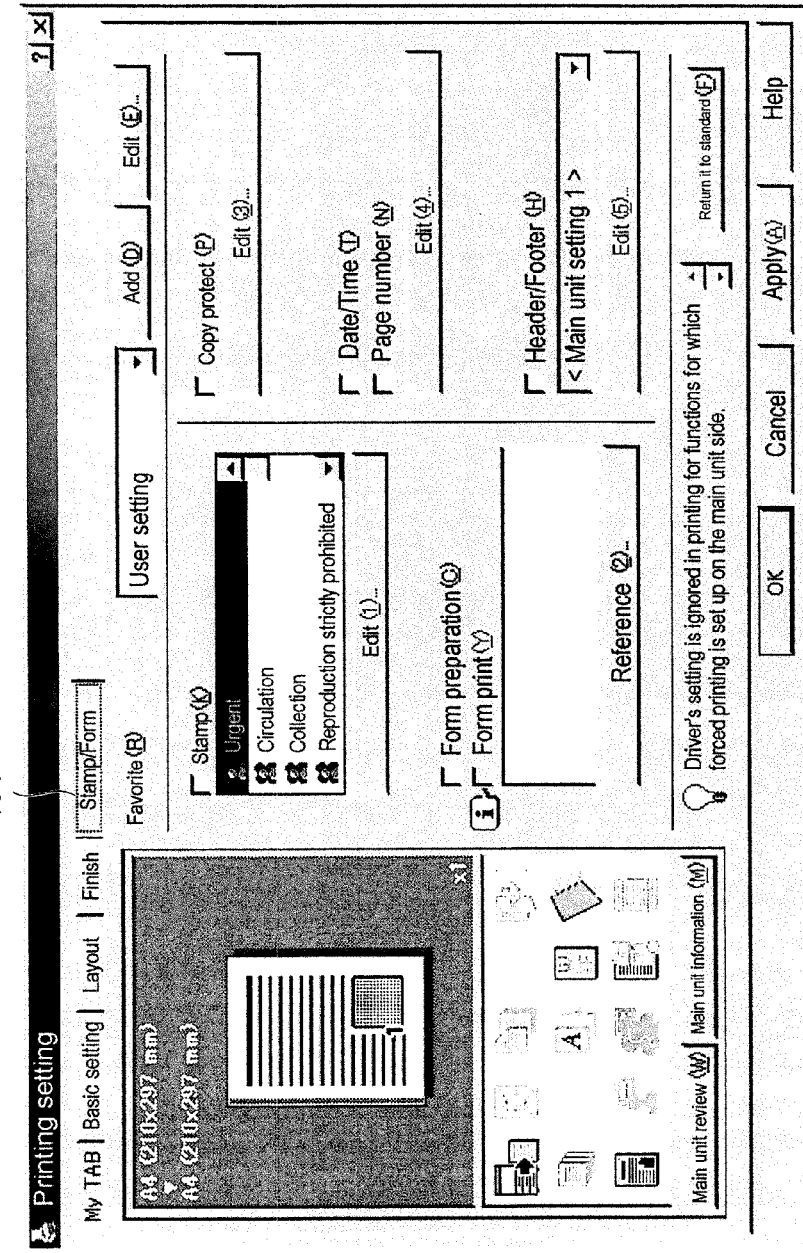
FIG. 9 is a diagram showing an example printing setting screen on which the stamp/form tab is selected.

FIG. 5(A) shows an example of a printing setting screen 100a provided to the user of the server PC 2 (hereinafter called the server manager) by the printer driver, and FIG. 5(B) shows an example of a printing setting screen 100b provided to the user of the client PC 3 by the printer driver.

As shown in FIG. 5(A), the printing setting screen 100a provided to the server manager has a basic setting tab 101, a layout tab 102, a finish tab 103, a stamp/form tab 104, and MyTAB tab 105. The tabs 101 through 105 are related to five screens that constitute the printing setting screen 100a respectively, and the screen switches as each tab is selected. A plurality of setting parameters for specifying the printing conditions are classified according to the functions on the screens that correspond with the basic setting tab 101, the layout tab 102, the finish tab 103, and the stamp/form tab 104 respectively, and each setting parameter is displayed as each corresponding tab is selected as shown in FIG. 6 through FIG. 9.

On the screen that corresponds with MyTAB tab 105 (hereinafter called MyTAB screen), the setting parameters that are selected by the server manager (e.g., "Document orientation" 106, "Number of copies" 107, "Staple" 108, "Punching" 109, "Stamp" 110, and "Copy protect" 111) among the plurality of setting parameters displayed on the screens corresponding the tabs 101 through 104 are collected, and these selected setting parameters are displayed thereon. Also, the MyTAB screen is provided with buttons such as an Edit button 112 for adding or deleting setting parameters to be displayed on the MyTAB screen and an OK button 113 for storing the setting of the printing setting screen 100a. Moreover, the setting value of a setting parameter displayed on the MyTAB screen and the setting value of the same setting parameter displayed on another screen are linked, so that if the setting value of the setting parameter on one of the screens varies, so does the setting value of the setting parameter on the other screen.

On the other hand, the printing setting screen 100b provided to the user of the client PC 3 by the printer driver has only the MyTAB tab 105, as shown in FIG. 5(B). The MyTAB screen of the client PC 3 is linked with the MyTAB screen of the server PC 2, and displays the setting parameters selected by the server manager on the server PC 2. In other words, the printing setting screen 100b provided by the printer driver installed on the client PC 3 displays only the "Document orientation" 106, "Number of copies" 107, "Staple" 108, "Punching" 109, "Stamp" 110, and "Copy protect" 111. Different from the MyTAB screen of the server PC 2, the MyTAB screen of the client PC 3 does not display the Edit button 112.

Figure 10:
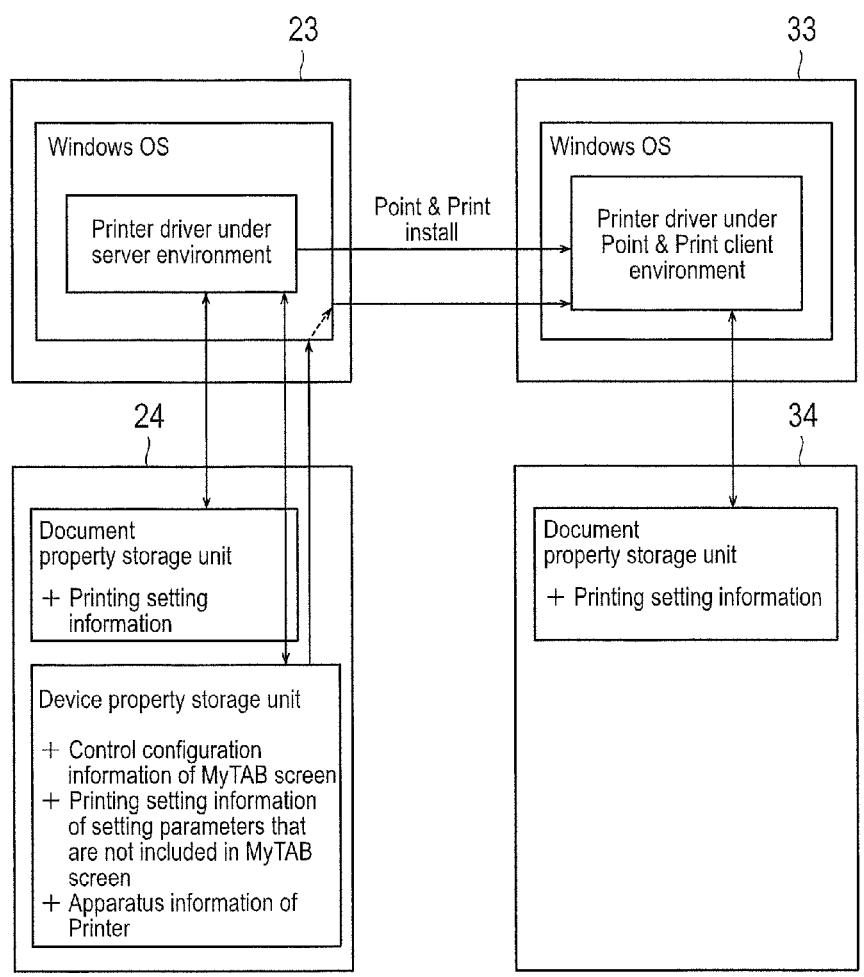
FIG. 10 is an outline diagram for describing the actions of the server PC and the client PC under the Point & Print environment.

FIG. 10 is an outline diagram for describing the actions of the server PC 2 and the client PC 3 under the Point & Print environment. In the server PC 2 and the client PC 3, the printer driver operates under the control of the Windows (registered trademark) OS (operating system).

As shown in FIG. 10, a document property storage unit and a device property storage unit will be formed in the hard disk 24 of the server PC 2 on which the printer driver is locally installed. The document property storage unit stores the printing setting information including the setting values of all the setting parameters. The device property storage unit stores the control configuration information including at least one setting parameter displayed on the MyTAB screen, the printing setting information including setting values of setting parameters other than the setting parameters displayed on the MyTAB screen, and the apparatus information of the printer 1. The document property storage unit and the device property storage unit are controlled by the Windows (registered trademark) OS. The information acquired from the document property storage unit and the device property storage unit of the hard disk 24 is developed on the RAM 23 of the server PC 2. The printer driver locally installed on the server PC 2 provides the printing setting screen 100a based on the information developed on the RAM 23.

On the other hand, in the hard disk 34 of the client PC 3 on which the printer driver is Point & Print installed, the document property storage unit is formed but the device property storage unit is not formed. The document property storage unit stores the printing setting information including the setting values of all the setting parameters. The information acquired from the document property storage unit of the client PC 3 and the information acquired from the device property storage unit of the server PC 2 are developed on the RAM 33 of the client PC 3. The printer driver Point & Print installed on the client PC 3 provides the printing setting screen 100b based on the information developed on the RAM 33.

In the printing system according to the present embodiment configured as described in the above, various setting parameters can be applied to a print job executed by the printer 1. The server manager can restrict the setting parameters that allow the user of the client PC 3 to modify the setting values through the printing setting screen 100a provided by the printer driver. In the present embodiment, a PC judges by itself according to the printer driver's program whether it is the server PC 2 or the client PC 3 and provides either the printing setting screen 100a or 100b to the user depending on the judgment result.

The process of the printer driver providing the printing setting screen 100 in the server PC 2 and the client PC 3 is described below with reference to FIGS. 11 through 13. The algorithm shown in the flowchart of FIG. 11 is stored as a program in a memory unit such as the hard disks 24 and 34 of the server PC 2 and the client PC 3, and is executed by the CPUs 21 and 31.

First, the request for displaying the printing setting screen 100 is received (step S101). In the present embodiment, the Windows (registered trademark) OS calls up the DDI: Drv- DocumentPropertySheets of the printer driver with UI (user interface) display message and requests the printer driver's own UI display information.

Next, the process of judging the printer driver's operating environment is executed, and a judgment is made as to whether the printer driver's operating environment is the server environment or the client environment (steps S102, S103). In other words, the PC currently executing this process makes a judgment whether it is the server PC 2 or the client PC 3. The details of the server/client judgment process shown in step S102 will be described in detail later.

If the operating environment of the printer driver is judged to be the server environment (step S103: No), the dialog procedures for the basic setting tab 101, layout tab 102, finish tab 103, stamp/form tab 104, and MyTAB tab 105 are defined (step S104). In the present embodiment, five kinds of dialog procedures are defined so that the printing setting screen 100a having the basic setting tab 101, layout tab 102, finish tab 103, stamp/form tab 104, and MyTAB tab 105 as shown in FIG. 5(A) can be displayed.

On the other hand, if the operating environment of the printer driver is judged to be the client environment (step S103: Yes), the procedure for the MyTAB tab 105 is defined (step S105). In the present embodiment, one kind of dialog procedure is defined so that the printing setting screen 100b having only the MyTAB tab 105 as shown in FIG. 5(B) can be displayed.

Next, the printing setting information is read from the document property storage unit (step S106). In the present embodiment, the printing setting information containing the setting values of all the setting parameters is read from the document property storage unit of the PC that is executing this process. The printing setting information thus read in is developed on the RAM.

Next, the control configuration information of the MyTAB screen is read from the device property storage unit of the server PC 2 (step S107). In the present embodiment, the control information containing the setting parameters to be displayed on the MyTAB screen (e.g., "Document orientation" 106, "Number of copies" 107, "Staple" 108, "Punching" 109, "Stamp" 110, and "Copy protect" 111) is read from the device property storage unit of the server PC 2. The control information thus read in is developed on the RAM of the PC currently executing this process.

Next, the printing setting information including the setting values of the setting parameters that are not included in the MyTAB screen is read from the device property storage unit of the server PC 2 (step S108). In the present embodiment, the printing setting information containing the setting values of the setting parameters (e.g., "Document size," "Paper feed tray," etc.) other than the setting parameters contained in the MyTAB screen (e.g., "Document orientation" 106, "Number of copies" 107, "Staple" 108, "Punching" 109, "Stamp" 110, and "Copy protect" 111) is read from the device property storage unit of the server PC 2.

Next, the printing setting information read in the process shown in step S106 is overwritten by the printing setting information read in the process shown in step S108 (step S109). The printing setting information read in step S108 does not contain the setting values of the setting parameters displayed on the MyTAB screen, only the setting values of setting parameters that are not displayed on the MyTAB screen (e.g., "Document size," "Paper feed tray," etc.) among the printing setting information read in the process shown in step S106 are overwritten. The dialog procedure defined in the process shown in step S104 or S105, the control configuration information of the MyTAB screen, and the printing setting overwritten in the process shown in step S109 are delivered to the Windows (registered trademark) OS as the UI display information from the printer driver.

As shown in FIG. 12, the UI display information contains the dialog procedure definition information, the control configuration information of the MyTAB screen, and the printing setting information. The dialog procedure definition information contains the dialog procedure defined in correspondence with the tab that constitutes the printing setting screen 100. The control configuration information of the MyTAB screen contains at least one of the setting parameters displayed on the MyTAB screen (e.g., "Document orientation," "Number of copies," "Staple," "Punching," "Stamp," and "Copy protect"). The printing setting information contains the setting values of the setting parameters (e.g., Document orientation=vertical, Number of copies=1, etc.).

Next, the process of judging the printer driver's operating environment is executed, and a judgment is made as to whether the printer driver's operating environment is the server environment or the client environment (steps S110, S111).

If the operating environment of the printer driver is judged to be the server environment (step S111: No), the program advances to the process shown in step S113. On the other hand, if the operating environment of the printer driver is judged to be the client environment (step S111: Yes), the use of the Edit button 112 on the MyTAB screen becomes prohibited (step S112). In the present embodiment, API: EnableWindow (hwnd, FALSE) and API: ShowWindow (hwind, SW_HIDE) are called out sequentially to the WindowHandle: hwnd of the Edit button 112.

Next, the setting values of the setting parameters are updated (step S113). In the present embodiment, the setting values contained in the printing setting information overwritten in the process shown in step S109 are reflected upon the corresponding setting parameters.

The printing setting screen 100 is then displayed (step S114), and the process is terminated. In the present embodiment, the defined dialog procedure is called out by the UI initialization message based on the UI display information and the result is output to the display.

As can be seen from the above, according to the flowchart shown in FIG. 11, the PC executing the process judges whether it is the server PC 2 or the client PC 3. When the own PC is judged that it is the server PC 2, the printing setting screen 100a having the five tabs 101 through 105 as shown in FIG. 5(A) is provided to the server manager. On the other hand, when the own PC is judged that it is the client PC 3, the printing setting screen 100b having only the MyTAB tab 105 as shown in FIG. 5(B) is provided to the user of the client PC 3.

Next, the server/client judgment process shown in steps S102 and S110 of FIG. 11 is described in detail with reference to FIG. 13. The algorithm shown in the flowchart of FIG. 13 is stored as a program in a memory unit such as the hard disks 24 and 34 of the server PC 2 and the client PC 3, and is executed by the CPUs 21 and 31.

Figure 13:
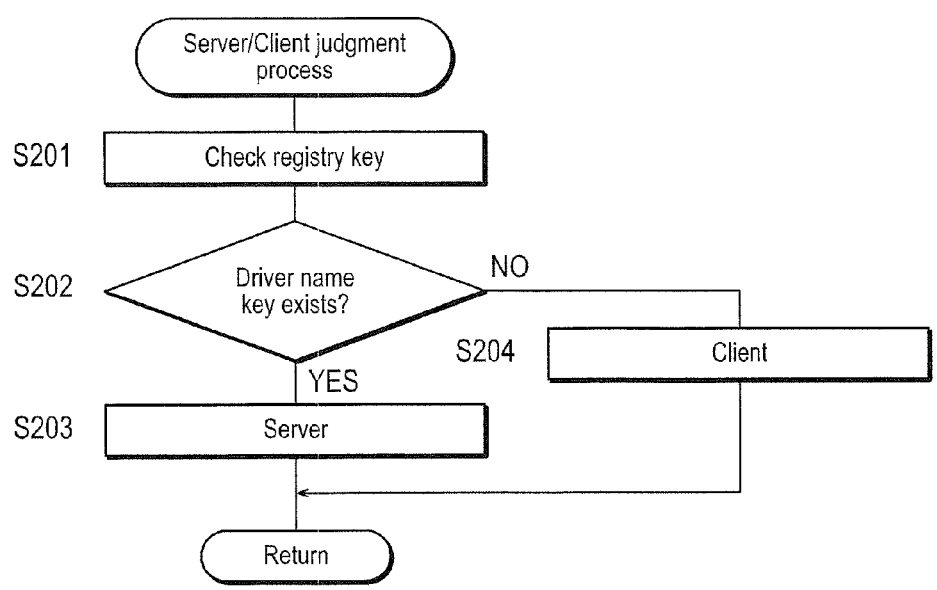
FIG. 13 is a flowchart for describing the server/client judgment process indicated in steps S102 and S110 of FIG. 11.

As shown in FIG. 13, the registry key is first referenced according to the server/client judgment process of the present embodiment (step S201). In the present embodiment, the registry key: HKEY_LOCAL_MACHINE¥System¥CurrentControlSet¥Control¥Print¥Printers is referenced as the identification information.

Next, a judgment is made as to whether the key is prepared or not under the name of the printer driver (step S202). In the specification of the Windows (registered trademark) OS, the key under the model name of the corresponding printer driver is prepared in the abovementioned registry key under the environment where the printer driver is locally installed. On the other hand, the key under the model name of the printer driver is not prepared in the abovementioned registry key under the environment where the printer driver is Point & Print installed.

When the key under the name of the printer driver is prepared (step S202: Yes), a judgment is made that the printer driver's operation environment is the server environment (step S203), and the process is terminated. On the other hand, when the key under the name of the printer driver is not prepared (step S202: No), a judgment is made that the printer driver's operation environment is the client environment (step S204), and the process is terminated.

As can be seen from the above, in case when the printer driver is installed on the server PC 2, the printing setting screen 100a that has all the tabs 101 through 105 is provided to the server manager according to the process of the flowchart shown in FIG. 11 and FIG. 13. In case when the printer driver is installed on the client PC 3, the printing setting screen 100b that has only the MyTAB tab is provided to the user of the client PC 3.

Therefore, if the server manager edits the MyTAB screen to collect the setting parameters that permit the user of the client PC 3 to modify the setting values on the MyTAB screen, the printing setting screen 100b that displays only the setting parameters for which the setting value modification is allowed is provided to the user of the client PC 3. The user of the client PC 3 can set up the printing condition by modifying only the setting values of the setting parameters displayed collectively on the MyTAB screen. The setting values of the server PC 2 are reflected upon the setting values of the setting parameters that are not allowed to be modified.

Next, the process of editing the control configuration of the MyTAB screen in the printing setting screen 100a provided by the printer driver installed on the server PC 2 is described below with reference to FIG. 14 through FIG. 16.

FIG. 14 is a diagram showing a printing setting screen in which no setting parameter that is allowed to be used by the user of the client PC 3 is selected.

Figure 14A:
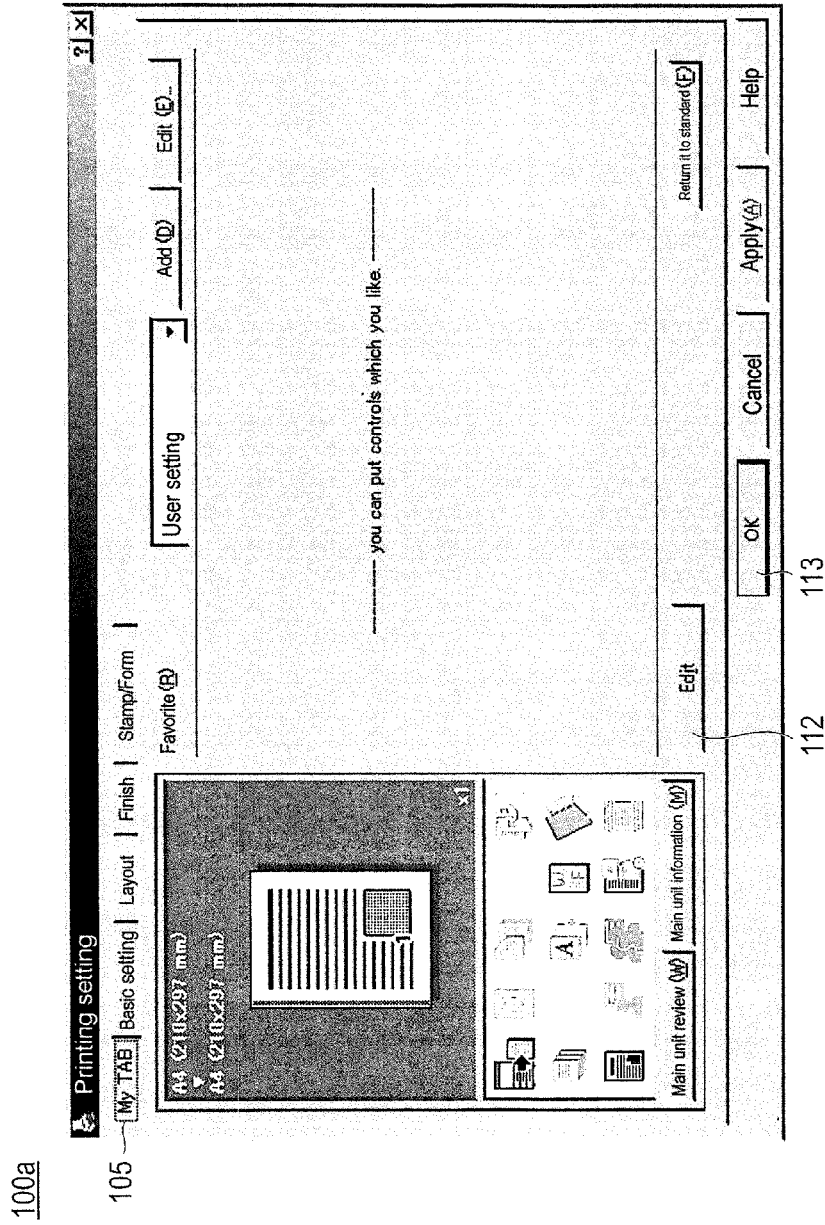
FIG. 14(A) is a diagram showing an example of printing setting screen in which no setting parameter that is allowed to be used by the user of the client PC is selected.
Figure 14B:
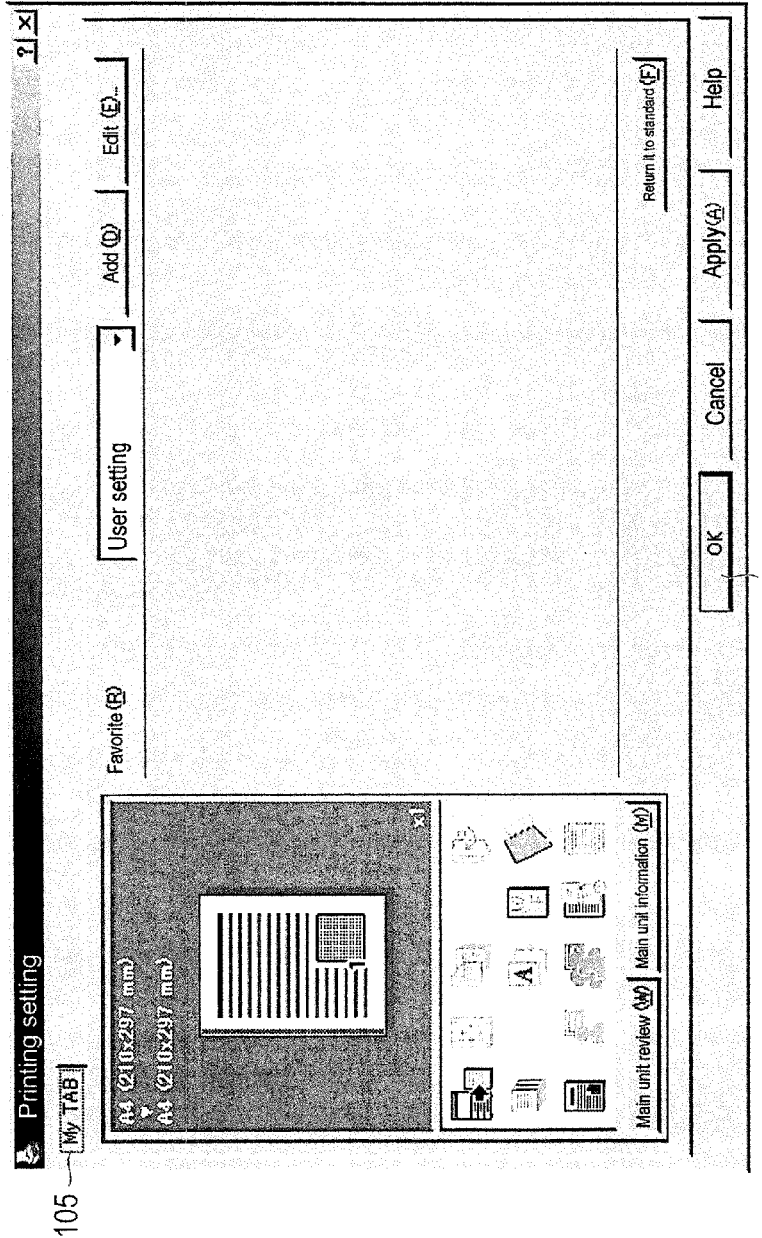
FIG. 14(B) is a diagram showing an example of printing setting screen in which no setting parameter that is allowed to be used by the user of the client PC is selected.

FIG. 14(A) shows an example of a printing setting screen provided to the user of the server PC 2 by the printer driver, and FIG. 14(B) shows an example of a printing setting screen provided to the user of the client PC 3 by the printer driver.

As mentioned above, the printing setting screens 100a and 100b displayed on the server PC 2 and the client PC 3 are linked together, and no setting parameter will be displayed on the printing setting screen 100b of the client PC 3 if the setting parameters displayed on the MyTAB screen of the server PC 2 are not selected by the server manager.

Figure 15:
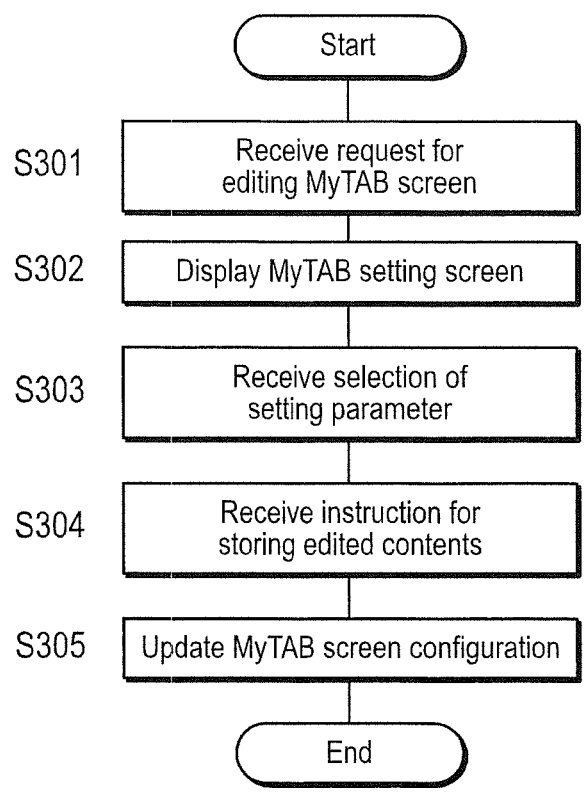
FIG. 15 is a flowchart for describing the process of editing the control configuration of the MyTAB screen on the printing setting screen provided by the printer driver installed on the server PC.

FIG. 15 is a flowchart for describing the process of editing the control configuration of the MyTAB screen in the printing setting screen 100a provided by the printer driver installed on the server PC 2. The algorithm shown in the flowchart of FIG. 15 is provided by the printer driver and is stored as a program in a memory unit such as the hard disks 24 and 34 of the server PC 2 and the client PC 3. However, the algorithm shown in the flowchart of FIG. 15 is executed only by the CPU 21 of the server PC 2.

First, the request for editing the MyTAB screen is received (step S301). In the present embodiment, the request for editing the MyTAB screen is received as the Edit button 112 is pressed (clicked) on the printing setting screen 100a shown in FIG. 14(A).

Figure 16A:
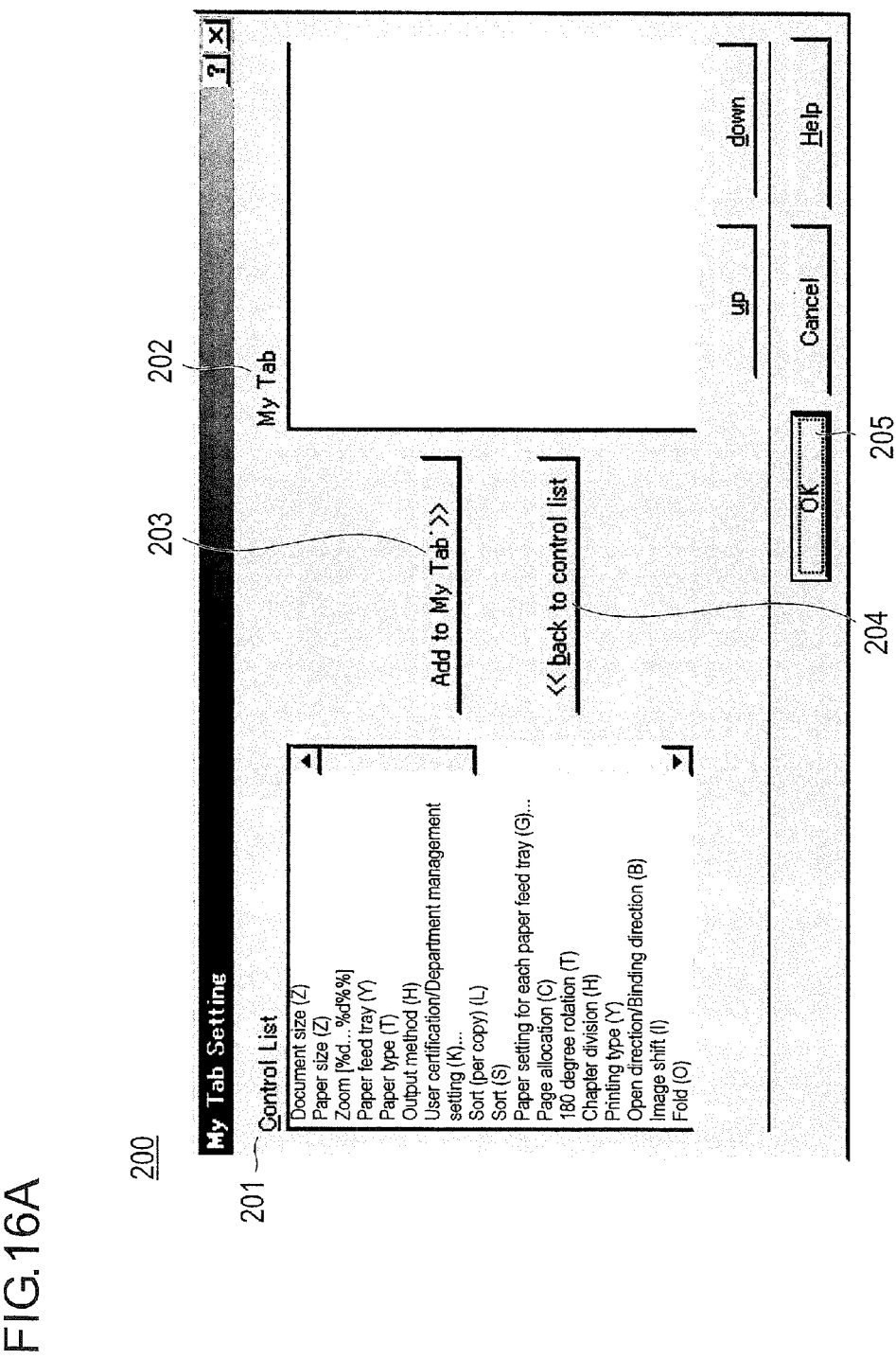
FIG. 16(A) is a diagram showing an example of the MyTAB setting screen provided by the printer driver installed on the server PC.

Next, the MyTAB setting screen 200 is displayed (step S302). As shown in FIG. 16(A), the MyTAB setting screen 200 has a control list 201, a MyTAB control list 202, an add button 203, a delete button 204, and an OK button 205. The control list 201 provides a list of setting parameters displayed in groups of functions on the screens corresponding to the basic setting tab 101, the layout tab 102, the finish tab 103, and the stamp/form tab 104 respectively. MyTAB control list 202 lists the setting parameters displayed on the MyTAB screen. The add button 203 and the delete button 204 are to allow the user to select the setting parameters to be displayed on the MyTAB screen among a plurality of setting parameters displayed on the control list 201. The OK button 205 is for accepting the instruction for storing the contents of the edition.

Figure 16B:
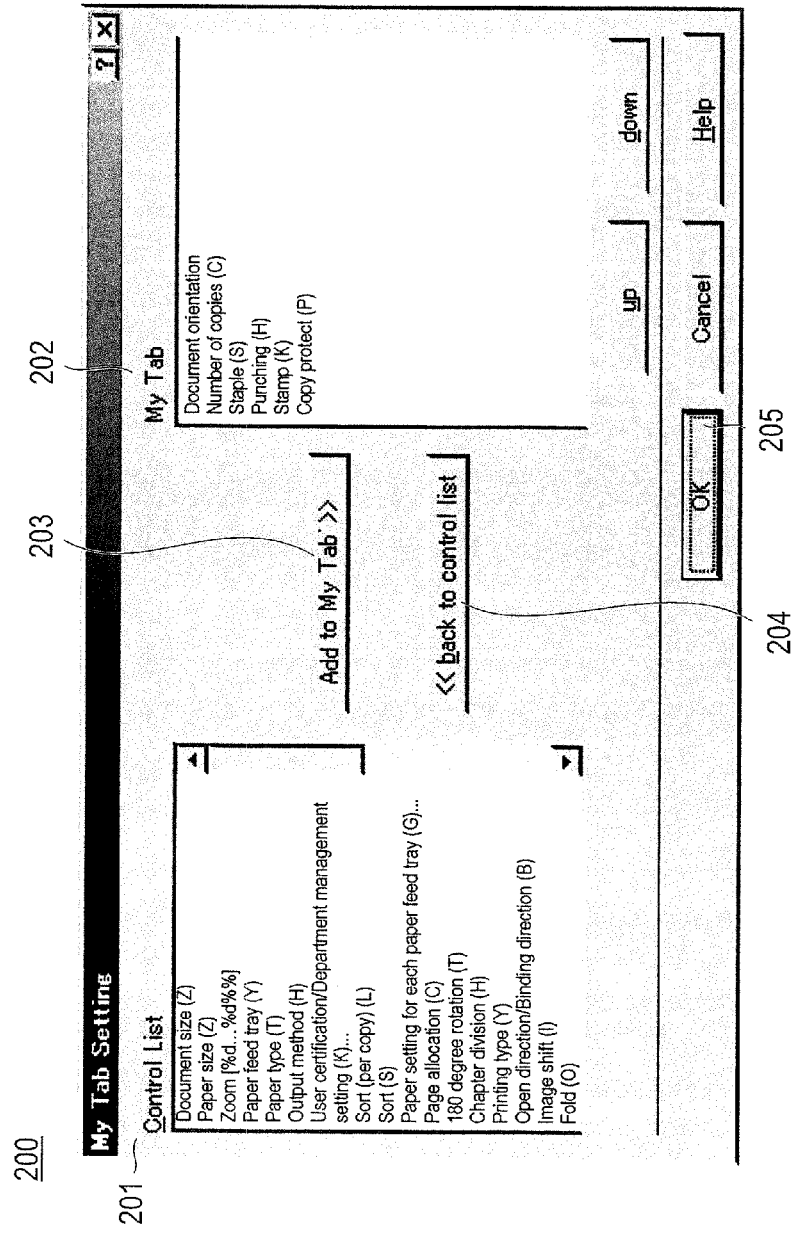
FIG. 16(B) is a diagram showing an example of the MyTAB setting screen provided by the printer driver installed on the server PC.

Next, the selection of the setting parameters to be displayed on the MyTAB screen by the user is received (step S303). In the present embodiment, the setting parameters whose setting values are allowed to be modified by the user of the client PC 3 are selected by the server manager's operation. As shown in FIG. 16(B), the selected setting parameters are displayed on the MyTAB control list 202.

Next, the instruction for storing the edited contents is received (step S304). In the present embodiment, the instruction for storing the edited contents is received as the OK button 205 is clicked.

The control configuration of the MyTAB screen is then updated based on the editing result (step S305), and the process is terminated. In the present embodiment, the setting parameters selected in the process shown in step S303 are displayed on the MyTAB screen, and the printing setting screen 100a having the MyTAB screen shown in FIG. 5(A) is formed.

Next, the process of storing the setting of the printing setting screen 100 in the server PC 2 and the client PC 3 is described below with reference to FIG. 17. The algorithm shown in the flowchart of FIG. 17 is stored as a program in a memory unit such as the hard disks 24 and 34 of the server PC 2 and the client PC 3, and is executed by the CPUs 21 and 31.

Figure 17:
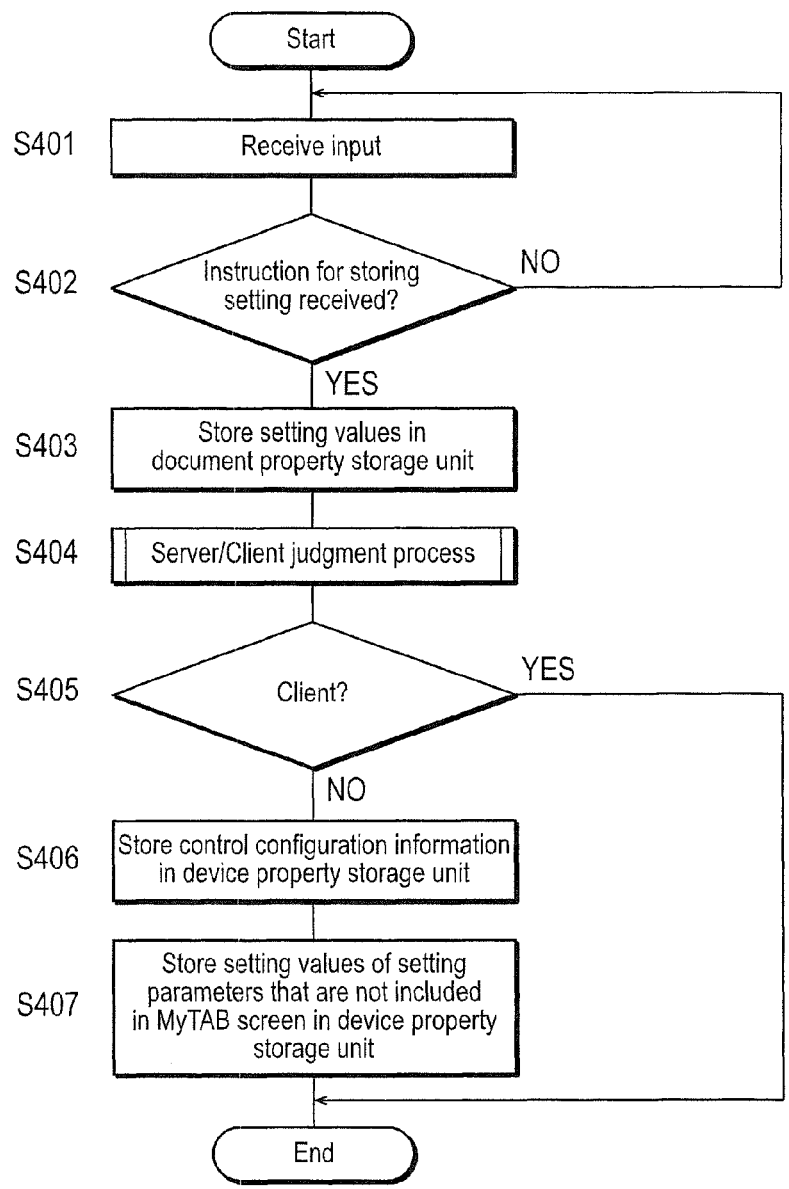
FIG. 17 is a flowchart for describing the process of storing the setting of the printing setting screen in the server PC and the client PC.

As shown in FIG. 17, various inputs by the user are received through the printing setting screen 100 (step S401). In case the PC executing this process is the server PC 2, the input by the user's operation for selecting the setting parameters to be displayed on the MyTAB screen as described above, or the input such as modifications of setting values of the setting parameters that are not displayed on the MyTAB screen is received. On the other hand, in case the PC executing this process is the client PC 3, the modification of the setting values of the setting parameters displayed on the MyTAB screen is received. The storage of the setting can be also instructed by clicking of the OK button, cancel button and other buttons of the printing setting screen 100. The dialog procedures for the tabs 101 through 105 are called out by the message corresponding to the input. Since the process itself of receiving the modification of the setting values is a common process provided by the printer driver, detailed description is omitted.

Next, a judgment is made as to whether the storage of the setting of the printing setting screen 100 is instructed or not (step S402). In the present embodiment, it is judged that the storage of the setting is instructed as the OK button 113 is clicked on the printing setting screen 100.

If no instruction for the storage of the setting is made (step S402: No), the process of step S401 and thereafter is repeated. On the other hand, if the instruction for the storage of the setting is made (step S402: Yes), the dialog procedure for the tabs 101 through 105 is called out by the storage completion message, and the UI display information is updated based on the printing setting, which is the result of editing of the printing setting screen 100 by the user. The UI display information from the dialog procedure is handed over to the Windows (registered trademark) OS.

Next, the setting values are stored in the document property storage unit (step S403). In the present embodiment, the Windows (registered trademark) OS calls up the printer driver's DDI: DrvDocumentPropertySheets with the printing information storage message, and delivers the UI display information received from the dialog procedure. The internal function_DrvDocumentPropertySheets (printing information storage) is executed, and the printing setting information contained in the UI display information is stored in the document property storage unit of the PC that is executing this process.

Next, the process of judging the printer driver's operating environment is executed, and a judgment is made as to whether the printer driver's operating environment is the server environment or the client environment (steps S404, S405).

If the operating environment of the printer driver is judged to be the server environment (step S405: No), the control configuration information of the MyTAB screen is stored in the device property storage unit of the hard disk 24 of the server PC 2 (step S406). The printing setting information of the setting parameters that are not displayed on the MyTAB screen is stored in the device property storage unit of the hard disk 24 of the server PC 2 (step S407), and the process is terminated. The order of execution of the steps S406 and S407 can be reversed.

On the other hand, if the operating environment of the printer driver is judged to be the client environment (step S405: Yes), the process is terminated without the above setting being stored in the device property storage unit.

As can be seen from the above, the setting of the printing setting screen 100 edited by the user is stored according to the process of the flowchart shown in FIG. 17. If the PC executing the process judges by itself that it is the server PC 2, the printing setting information is stored in both the document property storage unit and the device property storage unit and the control configuration information of the MyTAB screen is stored in the device property storage unit as well. On the other hand, if the PC executing the process judges by itself that it is the client PC 3, only the printing setting information is stored in the document property storage unit.

As can be seen from the above, according to the information processing apparatus, the information processing method, and the computer readable recording medium stored with the information processing program of the present embodiment, the PC that is executing the process of the program of the printer driver makes a judgment by itself whether it is the server PC 2 or the client PC 3 and provides the user with the printing setting screen 100 according to the judgment result. Therefore, the server manager can restrict the setting parameters that are allowed to be used by the user of the client PC 3 by using only the program of the printer driver without using a separate dedicated program.

Moreover, according to the information processing apparatus, the information processing method, and the computer readable recording medium stored with the information processing program of the present embodiment, since the setting parameters that are allowed to be used are displayed collectively on the MyTAB screen, the user of the client PC 3 can modify the setting values of the setting parameters that are allowed to be used without having to switch the screen by selecting the tab. Furthermore, the useless area of the printing setting screen can be minimized in comparison with a case of graying out the setting parameters that are not allowed to be used.

Therefore, a process with a better operating use, visibility, and operability can be realized according to the information processing apparatus, the information processing method, and the computer readable recording medium stored with the information processing program of the present embodiment.

The invention is not limited to the embodiment described above, but also can be changed in various ways within the scope of the claims.

For example, in the abovementioned embodiment, the setting parameters are displayed collectively on the MyTAB screen as a method of restricting the setting parameters that can be used by the user of the client PC. However, it is possible to gray out the setting parameters that are not allowed to be used without modifying the configuration of the printing setting screen.

Also, the printer is assumed to be connected with the server PC via the network in the above embodiment. However, the printer can be directly connected to the server PC.

The unit and method of conducting various processes in the information processing apparatus according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is ordinarily transferred to and stored in a memory unit such as a hard disk. Said program can also be provided as independent application software or can be built into the software of the information processing apparatus as a part of its function.

What is claimed is:

1. An information processing apparatus to be used in a printing system, said printing system having a client apparatus, a server apparatus, and an image forming apparatus, all of which are connected by a network, wherein said client apparatus executes a printer driver for setting a plurality of setting parameters concerning printing conditions of said image forming apparatus, and wherein said server apparatus provides said client apparatus with said printer driver and executes said printer driver, either said client apparatus or said server apparatus serving as said information processing apparatus, the information processing apparatus comprising:

a receiving unit for receiving a request to activate said printer driver;

a judgment unit for judging whether or not said printer driver is installed by the Point & Print function; and a control unit for allowing a user to select one or more of the setting parameters to be displayed on a predetermined screen of said activated printer driver among said plurality of setting parameters and allowing the user to modify setting values of all of said plurality of setting parameters, when it is judged that said printer driver is not installed by the Point & Print function, said control unit further allowing said user to modify only setting values of said one or more selected setting parameters displayed on the predetermined screen of said activated printer driver and preventing said user from adding or deleting setting parameters to be displayed on the predetermined screen of said activated printer driver, when it is judged that said printer driver is installed by the Point & Print function.

2. The information processing apparatus as claimed in claim 1, wherein
said client apparatus having said printer driver for said image forming apparatus copied from said server apparatus via said network; and
said printer driver is installed by the Point & Print function when said printer driver is copied from said server apparatus.

3. A non-transitory computer readable recording medium stored with an information processing program to be executed by an information processing apparatus to be used in a printing system, said printing system having a client apparatus, a server apparatus, and an image forming apparatus, all of which are connected by a network, wherein said client apparatus executes said information processing program for setting a plurality of setting parameters concerning printing conditions of said image forming apparatus, and wherein said server apparatus provide said client apparatus with said information processing program and executes said information processing program,
either said client apparatus or said server apparatus serving as said information processing apparatus, and said information processing program causing said information processing apparatus to execute a process comprising:
receiving a request to activate said information processing program;
judging whether or not said information processing program is installed by the Point & Print function;
allowing a user to select one or more of the setting parameters to be displayed on a predetermined screen of said activated information processing program among said plurality of setting parameters and allowing the user to modify setting values of all of said plurality of setting parameters, when it is judged that said information processing program is not installed by the Point & Print function; and
allowing said user to modify only setting values of said selected setting parameters displayed on the predetermined screen of said activated information processing program and preventing said user from adding or deleting setting parameters to be displayed on the predetermined screen of said activated information processing program, when it is judged that said information processing program is installed by the Point & Print function.

4. The non-transitory computer readable recording medium as claimed in claim 3, wherein
said client apparatus having said information processing program for said image forming apparatus copied from said server apparatus via said network; and
said information processing program is installed by the Point & Print function when said information processing program is copied from said server apparatus.

5. The non-transitory computer readable recording medium as claimed in claim 3, wherein said information processing program is a printer driver.

6. An information processing method to be used for an information processing apparatus to be used in a printing system, said printing system having a client apparatus, a server apparatus, and an image forming apparatus, all of which are connected by a network, wherein said client apparatus executes a printer driver for setting a plurality of setting parameters concerning printing conditions of said image forming apparatus, and wherein said server apparatus provides said client apparatus with said printer driver and executes said printer driver,
either said client apparatus or said server apparatus serving as said information processing apparatus, and said information processing method comprising:
receiving a request to activate said printer driver;
judging whether or not said printer driver is installed by the Point & Print function;
allowing a user to select one or more of the setting parameters to be displayed on a predetermined screen of said activated printer driver among said plurality of setting parameters and allowing the user to modify setting values of all of said plurality of setting parameters, when it is judged that said printer driver is not installed by the Point & Print function; and
allowing said user to modify only setting values of said selected setting parameters displayed on the predetermined screen of said activated printer driver and preventing said user from adding or deleting setting parameters to be displayed on the predetermined screen of said activated driver, when it is judged that said printer driver is installed by the Point & Print function.

7. An information processing apparatus on which a printer driver for setting up a plurality of setting parameters of printing conditions for an image forming apparatus is installed, the information processing apparatus comprising a processor, wherein said processor executes the processes of:
judging whether or not said printer driver is installed by the Point & Print function;
allowing a user to add or delete at least one first setting parameter to be displayed on a first screen of said printer driver among said plurality of setting parameters and allowing the user to modify setting values of all of said plurality of setting parameters when it is judged that said printer driver is not installed by the Point & Print function; and
preventing the user from adding or deleting at least one first setting parameter to be displayed on the first screen of said printer driver and allowing the user to modify only setting values of the first setting parameter displayed on the first screen of said printer driver among said plurality of setting parameters when it is judged that said printer driver is installed by the Point & Print function.

8. The information processing apparatus as claimed in claim 7, wherein
said processor judges whether or not said printer driver is installed by the Point & Print function, depending on whether or not a key under a model name of the printer driver is prepared in a registry key.

9. The information processing apparatus as claimed in claim 7, wherein
said printer driver can display a first tab as said first screen and at least one second tab other than said first tab,
said processor displays both said first tab and said at least one second tab and receives a selection of said first setting parameter to be displayed on said first tab among said plurality of setting parameters displayed on said at least one second tab when said printer driver is not installed by the Point & Print function.

10. The information processing apparatus as claimed in claim 9, wherein
said processor displays only said first tab without displaying said at least one second tab and receives only a modification of the setting values of said first setting parameter displayed on said first screen when said printer driver is installed by the Point & Print function.

11. A non-transitory computer readable recording medium stored with an information processing program to be executed by an information processing apparatus on which the information processing program for setting up a plurality of setting parameters of printing conditions for an image forming apparatus is installed, said information processing program causing the information processing apparatus to execute a process comprising the steps of:
- judging whether or not said information processing program is installed by the Point & Print function;
- allowing a user to add or delete at least one first setting parameter to be displayed on a first screen of said information processing program among said plurality of setting parameters and allowing the user to modify setting values of all of said plurality of setting parameters when it is judged that said information processing program is not installed by the Point & Print function; and
- preventing the user from adding or deleting at least one first setting parameter to be displayed on the first screen of said information processing program and allowing the user to modify only setting values of the first setting parameter displayed on the first screen of said information processing program among said plurality of setting parameters when it is judged that said information processing program is installed by the Point & Print function.

12. The non-transitory computer readable recording medium as claimed in claim 11, wherein
- in the step of judging, it is judged whether or not said information processing program is installed by the Point & Print function, depending on whether or not a key under a model name of said information processing program is prepared in a registry key.

13. The non-transitory computer readable recording medium as claimed in claim 11, wherein
- said information processing program can display a first tab as said first screen and at least one second tab other than said first tab,
- said information processing program displays both said first tab and said at least one second tab and receives a selection of said first setting parameter to be displayed on said first tab among said plurality of setting parameters displayed on said at least one second tab when said information processing program is not installed by the Point & Print function.

14. The non-transitory computer readable recording medium as claimed in claim 13, wherein
- said information processing program displays only said first tab without displaying said at least one second tab and receives only a modification of the setting values of said first setting parameter displayed on said first screen when said information processing program is installed by the Point & Print function.

15. The non-transitory computer readable recording medium as claimed in claim 11, wherein
- said information processing program is a printer driver.

16. An information processing method to be used for an information processing apparatus on which a printer driver for setting up a plurality of setting parameters of printing conditions for an image forming apparatus is installed, said information processing method comprising the steps of:
- judging whether or not said printer driver is installed by the Point & Print function;
- allowing a user to add or delete at least one first setting parameter to be displayed on a first screen of said printer driver among said plurality of setting parameters and allowing the user to modify setting values of all of said plurality of setting parameters when it is judged that said printer driver is not installed by the Point & Print function; and
- preventing the user from adding or deleting at least one first setting parameter to be displayed on the first screen of said printer driver and allowing the user to modify only setting values of the first setting parameter displayed on the first screen of said printer driver among said plurality of setting parameters when it is judged that said printer driver is installed by the Point & Print function.

17. An information processing method as claimed in claim 16, wherein
- in the step of judging, it is judged whether or not said printer driver is installed by the Point & Print function, depending on whether or not a key under a model name of the printer driver is prepared in a registry key.

18. An information processing method as claimed in claim 16, wherein
- said printer driver can display a first tab as said first screen and at least one second tab other than said first tab,
- said printer driver displays both said first tab and said at least one second tab and receives a selection of said first setting parameter to be displayed on said first tab among said plurality of setting parameters displayed on said at least one second tab when said printer driver is not installed by the Point & Print function.

19. An information processing method as claimed in claim 18, wherein
- said printer driver displays only said first tab without displaying said at least one second tab and receives only a modification of the setting values of said first setting parameter displayed on said first screen when said printer driver is installed by the Point & Print function.

* * * * *